United States Patent
Sahuguet

(10) Patent No.: US 8,949,439 B1
(45) Date of Patent: Feb. 3, 2015

(54) RESOURCE CONSCIOUS TETHERING

(75) Inventor: Arnaud Sahuguet, New York City, NY (US)

(73) Assignee: Google Inc., Mountain View, CA (US)

(*) Notice: Subject to any disclaimer, the term of this patent is extended or adjusted under 35 U.S.C. 154(b) by 133 days.

(21) Appl. No.: 13/551,098

(22) Filed: Jul. 17, 2012

Related U.S. Application Data

(60) Provisional application No. 61/640,942, filed on May 1, 2012.

(51) Int. Cl.
*G06F 11/00* (2006.01)

(52) U.S. Cl.
USPC ........... 709/227; 709/203; 370/329; 702/185; 702/188; 455/41.1

(58) Field of Classification Search
USPC .................. 709/227, 220, 203; 348/155–159
See application file for complete search history.

(56) References Cited

U.S. PATENT DOCUMENTS

| | | | | |
|---|---|---|---|---|
| 7,002,621 | B2* | 2/2006 | Adair et al. .................... | 348/158 |
| 7,382,268 | B2* | 6/2008 | Hartman ..................... | 340/573.1 |
| 8,494,566 | B2* | 7/2013 | Chen et al. .................... | 455/457 |
| 2002/0089589 | A1* | 7/2002 | Adair et al. .................... | 348/158 |
| 2007/0285258 | A1* | 12/2007 | Hartman ..................... | 340/573.1 |
| 2009/0182533 | A1* | 7/2009 | Neuenschwander et al. . | 702/185 |
| 2009/0228742 | A1 | 9/2009 | Lewallen | |
| 2010/0087167 | A1 | 4/2010 | Tsurutome et al. | |
| 2010/0267368 | A1 | 10/2010 | Masputra | |
| 2010/0272030 | A1 | 10/2010 | Babbar | |
| 2011/0316698 | A1* | 12/2011 | Palin et al. .................... | 340/540 |
| 2012/0096132 | A1* | 4/2012 | Lim et al. ...................... | 709/220 |
| 2012/0158918 | A1* | 6/2012 | Leblanc et al. ................ | 709/219 |
| 2013/0013991 | A1* | 1/2013 | Evans ........................... | 715/206 |
| 2013/0316682 | A1* | 11/2013 | Vieira ......................... | 455/414.1 |
| 2014/0127992 | A1* | 5/2014 | Kuscher et al. .............. | 455/41.1 |

* cited by examiner

*Primary Examiner* — Jude Jean Gilles
(74) *Attorney, Agent, or Firm* — McDonnell Boehnen Hulbert & Berghoff LLP

(57) ABSTRACT

A mobile communication device is provided that enables appropriate use of a network connection between the mobile communication device and a telecommunications network by a tethered computing device. The mobile communication device includes a first network interface configured for connection to a telecommunications network to establish a network connection and a second network interface configured for connection to a tethered computing device to establish a tethered connection and permit the tethered device to use the network connection. The device further includes a processor configured to obtain a first set of information regarding the network connection and either control use of the network connection by the tethered device responsive to the first set of information or provide, responsive to the first set of information, a second set of information directly to the tethered computing device prior to use of the network connection by the tethered computing device.

23 Claims, 3 Drawing Sheets

RESOURCE CONSCIOUS TETHERING

This application claims priority to U.S. Provisional Patent Application No. 61/640,942 filed May 1, 2012, the entire disclosure of which is incorporated herein by reference.

TECHNICAL FIELD

This disclosure relates to mobile communication devices and, in particular, to a device that enables appropriate use of a network connection between the mobile communication device and a telecommunications network by a tethered computing device.

BACKGROUND

One method for providing access to a telecommunications network (e.g. the public Internet) to a device that otherwise lacks the authority and/or the ability to directly access the network is to tether the device to another device having access to the network. It has therefore become a common practice to tether devices such as laptop computers, tablet computers and similar devices to cell phones and other mobile communication devices having access to a selected telecommunications network in order to provide the tethered device with access to the network. In this manner, the tethered device gains access to a telecommunications network when other forms of access (e.g., a Wi-Fi hotspot) are unavailable to the tethered device.

BRIEF SUMMARY

A communication system in accordance with one embodiment of the present teachings includes a tethered computing device and a mobile communication device. The mobile communication device includes a first network interface configured for connection to a telecommunications network to establish a wireless network connection with the telecommunications network. The mobile communication device also includes a second network interface configured for connection to the tethered computing device to establish a tethered connection with the tethered computing device and permit the tethered computing device to use the wireless network connection. The mobile communication device further includes a processor configured to obtain a first set of information regarding the wireless network connection and provide, responsive to the first set of information, a second set of information directly to the tethered computing device over the tethered connection prior to use of the wireless network connection by the tethered computing device. The tethered computing device is configured to determine, responsive to the second set of information, whether to use the wireless network connection and one or more characteristics of the use of the wireless network connection.

A mobile communication device in accordance with one embodiment of the present teachings includes a first network interface configured for connection to a telecommunications network to establish a wireless network connection with the telecommunications network. The device also includes a second network interface configured for connection to a tethered computing device to establish a tethered connection with the tethered computing device and permit the tethered computing device to use the wireless network connection. The device further includes a processor configured to obtain a first set of information regarding the wireless network connection and control the use of the wireless network connection by the tethered computing device responsive to the first set of information.

A mobile communication device in accordance with another embodiment of the present teachings includes a first network interface configured for connection to a telecommunications network to establish a wireless network connection with the telecommunications network. The device also includes a second network interface configured for connection to a tethered computing device to establish a tethered connection with the tethered computing device and permit the tethered computing device to use the wireless network connection. The device further includes a processor configured to obtain a first set of information regarding the wireless network connection and restrict use of the wireless network connection by the tethered computing device to a portion of a total bandwidth of the wireless network connection if the first set of information meets a predetermined characteristic.

An article of manufacture in accordance with another embodiment of the present teachings includes a computer storage medium having a computer program encoded thereon that when executed by a processor on a mobile communication device enables appropriate use of a wireless network connection between the mobile communication device and a telecommunications network by a tethered computing device having a tethered connection with the mobile communication device. The computer program includes code for obtaining a first set of information regarding the wireless network connection and controlling the use of the wireless network connection by the tethered computing device responsive to the first set of information.

A mobile communication device accordance with the present teachings is advantageous because the device enables appropriate use of a network connection between the mobile communication device and a telecommunications network by a tethered computing device. Because the tethered device is not directly connected to the telecommunications network, the tethered device is generally unaware of the characteristics of the wireless network connection between the mobile communication device and the telecommunications network. In particular, the tethered device is not aware of potential limitations of the wireless network connection including, for example, available bandwidth. As a result, the tethered device may attempt to make use of the wireless network connection in a way that either is not possible or that limits or prevents use of the wireless network connection by the mobile communication device. A device in accordance with the present teachings overcomes this problem either by using the mobile communication device to control use of the network connection by the tethered device or by providing information regarding limitations of the network connection to the tethered device so that the tethered device can properly manage its use of the network connection.

The foregoing and other aspects, features, details, utilities and advantages of the present teachings will be apparent from reading the following description and claims, and from reviewing the accompanying drawings.

DETAILED DESCRIPTION

Figure 1:
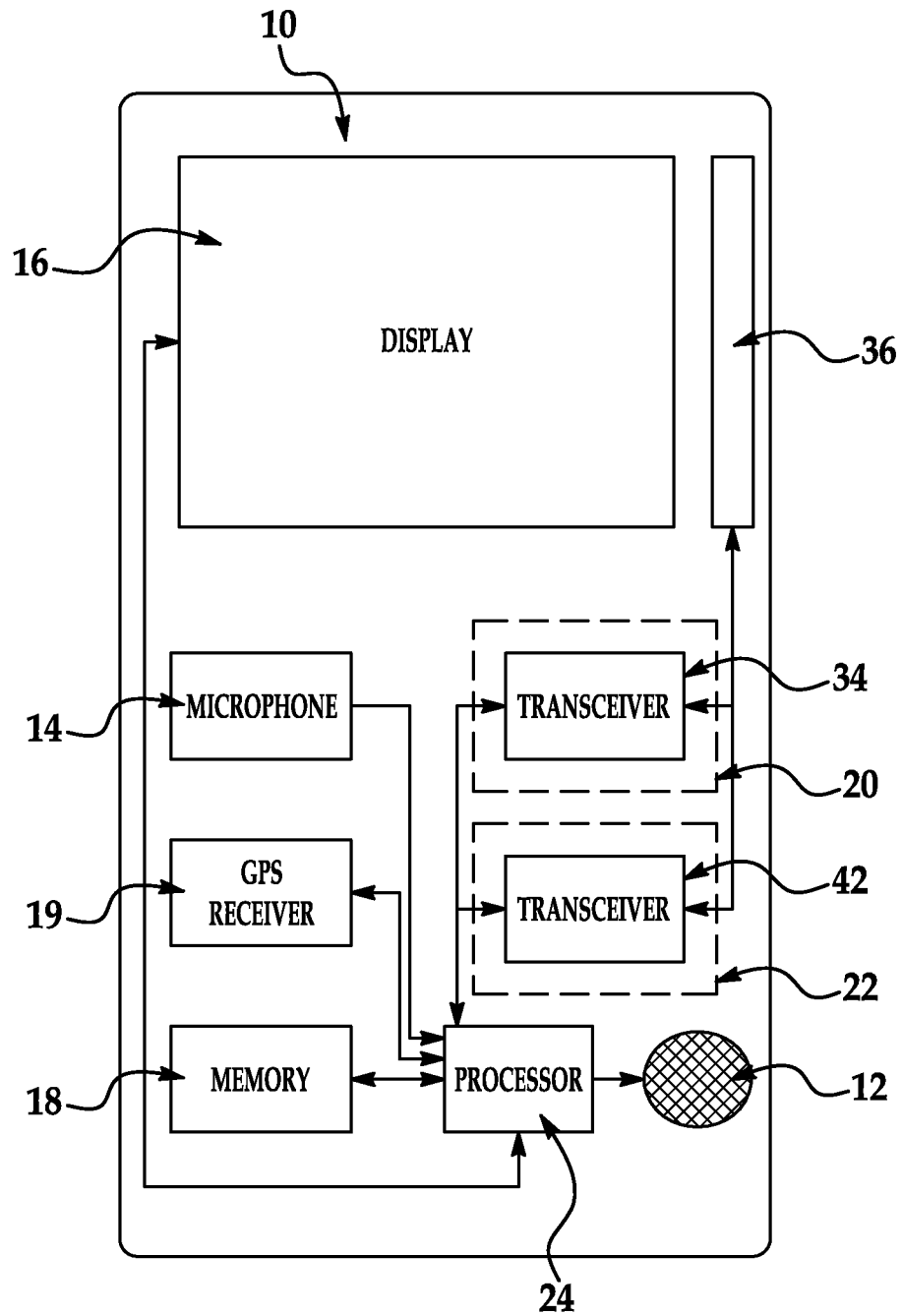
FIG. 1 is a diagrammatic view of a mobile communication device in accordance with one embodiment of the present teachings.

Referring now to the drawings wherein like reference numerals are used to identify identical components in the various views, FIG. 1 illustrates a mobile communication device 10 in accordance with one embodiment of the present teachings. In the illustrated embodiment, mobile communication device 10 comprises a cellular phone. It should be understood, however, that mobile communication device 10 may comprise any of a wide variety of devices configured for wireless communication with a cellular or other telecommunications network through which mobile communication device 10 may maintain communication with the network despite changes in location of mobile communication device 10 including, for example, tablet or laptop computers with wireless transceivers built in or connected thereto. Mobile communication device 10 may include cellular phone components including, for example, a speaker 12, a microphone 14, a display 16, and a memory 18. Mobile communication device 10 may also include a global positioning system (GPS) receiver 19. Although not illustrated, mobile communication device 10 may further include components such as a battery and power management and signal processing circuitry. In accordance with present teachings, mobile communication device 10 may also include a pair of network interfaces 20, 22 and an electronic control unit or processor 24.

Speaker 12 is an electric to acoustic transducer that generates sound in response to electrical signals indicative of audio communications. Microphone 14 is an acoustic to electric transducer that converts sound or mechanical vibration to electrical signals.

Display 16 functions as an input/output device for the user of mobile communication device 10. Display 16 may comprise, for example, a liquid crystal display or light emitting diode display. Display 16 provides a graphical user interface (GUI) to the user. Display 16 may function as only an output device with input received through other I/O devices such as a keyboard. Alternatively, display 16 may also function as an input device and may comprise a touch screen display including, for example capacitive or resistive touch screen displays.

Memory 18 is provided for storage of data and instructions or code (i.e. software) for processor 24. In accordance with one embodiment of the present teachings, memory 18 may include a computer program encoded thereon for enabling appropriate use of a network connection between mobile communication device 10 and a telecommunications network by a tethered computing device having a tethered connection with mobile communication device 10. Memory 18 may comprise various forms of non-volatile memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 18 may be internal to processor 24.

GPS receiver 19 provides a precise geographic position for use in navigational and other applications on mobile communication device 10. GPS receiver 19 receives signals from a plurality of satellites orbiting the Earth that enable GPS receiver 19 to determine a precise longitude and latitude for mobile communication device 10.

Figure 2:
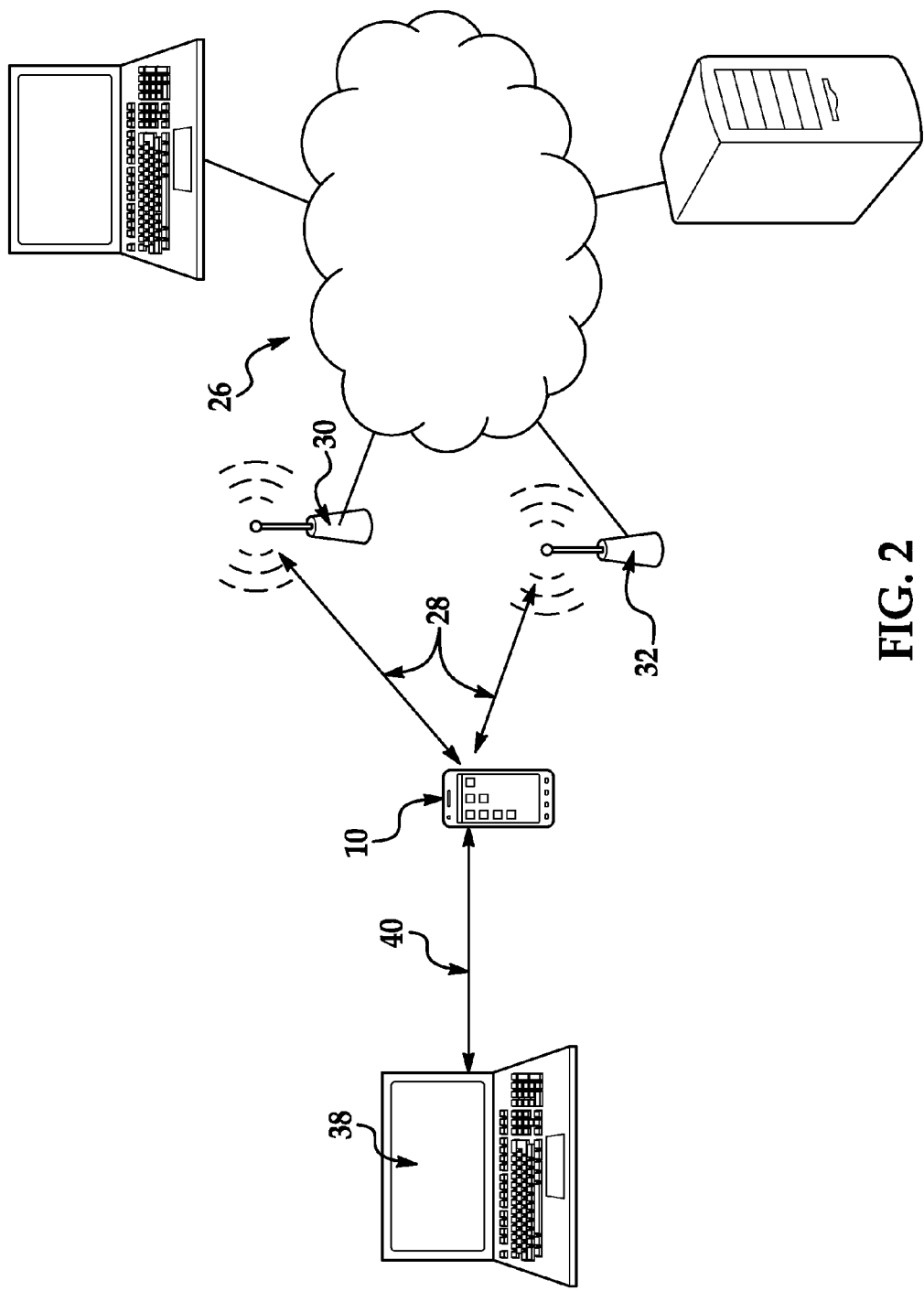
FIG. 2 is a diagrammatic view of the mobile communication device of FIG. 1 illustrating connections to a telecommunications network and a tethered computing device.

Referring to FIG. 2, network interface 20 is configured for connection to a telecommunications network 26 to establish a wireless network connection 28 with telecommunications network 26. Telecommunications network 26 may comprise a cellular telecommunications network made available by a wireless provider and accessible by mobile communication device 10. Telecommunications network 26 may further comprise the public internet, a local area network (LAN), wide area network (WAN), virtual private network (VPN) or other form of telecommunications network and telecommunications network 26 may comprise an intranet or extranet. Mobile communication device 10 may access telecommunications network 26 using one or more access points such as cellular base stations 30, 32 which may themselves be connected to a mobile telephone switching center that routes voice and data transmissions between mobile communication device 10 and telephone landlines and network servers (not shown). Referring again to FIG. 1, network interface 20 may comprise a wireless network interface controller having a radio transceiver 34 (it should be understood that GPS receiver 19 may also be integrated into network interface 20). Radio transceiver 34 is provided to transmit signals to and receive signals from an antenna 36 for wireless communication with telecommunications network 26. Radio transceiver 34 may communicate with access points 30, 32 using communication topologies including frequency, time and code division multiple access topologies (i.e. FDMA, TDMA, CDMA).

Referring again to FIG. 2, network interface 22 is configured for connection to a tethered computing device 38 to establish a tethered connection 40 with the tethered computing device 38 such that mobile communication device 10 acts as a wireless modem for tethered computing device 38 and permits tethered computing device 38 to access and use wireless network connection 28 through mobile communication device 10. Tethered computing device 38 may comprise a personal computing device such as a desktop, laptop or tablet computer as shown in the illustrated embodiment, but it should be understood that tethered computing device 38 may take on a wide variety of forms. Referring again to FIG. 1, tethered connection 40 may be a wireless connection and network interface 22 may again comprise a wireless network interface controller having a radio transceiver 42. Radio transceiver 42 may be similar to radio transceiver 34, but may be configured to short range wireless communication using short-range wireless technologies such as Wi-Fi (IEEE 802.11), Bluetooth, Zigbee, etc. Radio transceiver 42 may transmit and receive signals using antenna 36 or another antenna (not shown). Tethered connection 40 may also be a wired connection and network interface 22 may include a network interface controller having a connector (not shown) through which mobile communication device 10 may be connected to tethered computing device 38 using, for example, a USB cable.

Processor 24 is provided to obtain information regarding wireless network connection 28 and to either control use of wireless network connection 28 by tethered computing device 38 responsive to the information about wireless network connection 28 or provide information directly to tethered computing device 38 over the tethered connection 40 prior to use of the wireless network connection 28 by tethered computing device 38 so that tethered computing device 38 or a user of tethered computing device 38 can evaluate potential use of wireless network connection 28. Processor 24 may comprise one or more programmable microprocessors or microcontrollers. Processor 24 may include a central processing unit (CPU), memory (such as memory 18) and an input/output (I/O) interface through which processor 24 may receive a plurality of input signals including signals generated by microphone 14 and radio transceivers 34, 42 and generate a plurality of output signals including those used to control and/or provide data to speaker 12, display 16 and radio transceivers 34, 42.

Figure 3:
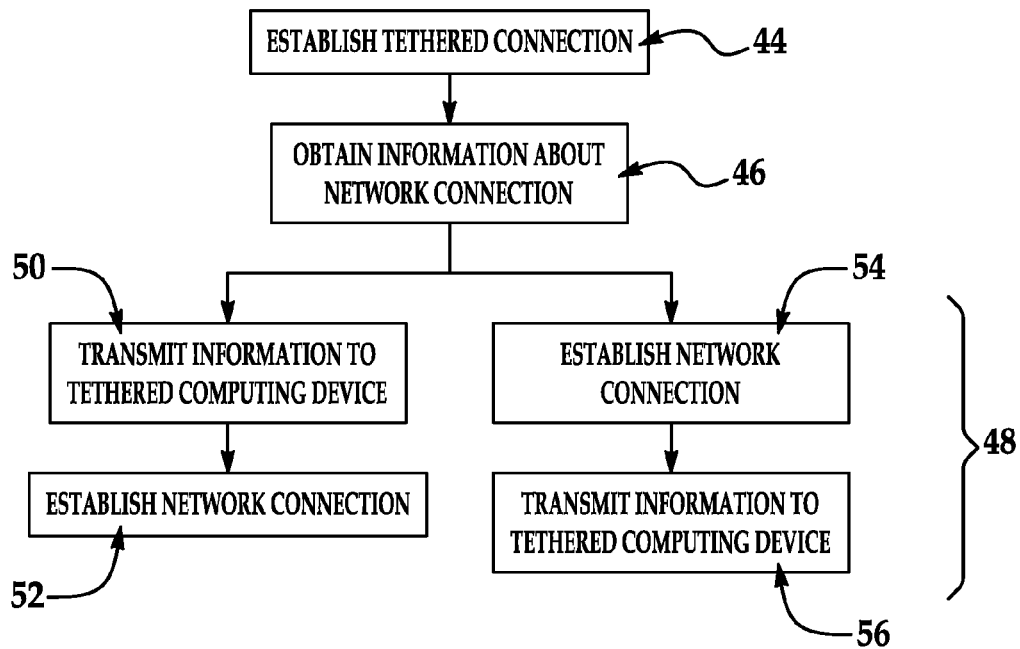
FIG. 3 is a flowchart illustrating several embodiments of a process in accordance with the present teachings for enabling appropriate use of a network connection between a mobile communication device and a telecommunications network by a tethered computing device.

In accordance with the present teachings, processor 24 may be configured with programming instructions from a computer program (i.e., software) to enable appropriate use of wireless network connection 28 between mobile communication device 10 and telecommunications network 26 by tethered computing device 38. Referring now to FIG. 3, the operation of processor 24 and mobile communication device 10 in accordance with several embodiments of the present teachings is illustrated. Mobile communication device 10 may begin with the process 44 of establishing tethered connection 40 with tethered computing device 38. A user of mobile communication device 10 may trigger this action by processor 24 by, for example, connecting a cable in the case of a wired tethered connection or by initiating a software application on mobile communication device 10 in the case of a wireless tethered connection. Working with network interface controller 22, processor 24 establishes a communication protocol and communication parameters for tethered connection 40.

Mobile communication device 10 may continue with the process 46 of obtaining a set of information regarding wireless network connection 28. Although FIG. 3 shows the process 46 of obtaining information about the network connection following the process 44 of establishing the tethered connection 40 it should be understood that the order of these processes 44, 46 could be reversed. Mobile communication device 10 may obtain information about wireless network connection 28 using computer programs or tools to measure characteristics such as transmission speeds, latency, packet loss and jitter. The information may include the name of the network or access point. In accordance with one aspect of the present teachings, however, the information includes characteristics regarding wireless network connection 28 to allow tethered computing device 38 to evaluate potential use of wireless network connection 28 and to enable appropriate use of network connection 28. The information may include, for example, the bandwidth of wireless network connection 28 so that tethered computing device 38 or a user of tethered computing device 38 knows whether sufficient bandwidth is available to accommodate high bandwidth applications (e.g. downloading software or music or uploading content such as digital photographs), whether such applications will incur costs under the wireless service contract between the owner of communications mobile communication device 10 and a wireless service provider, and whether such applications will limit or prevent other applications on communications mobile communication device 10 from operating properly or efficiently. The information may include latency of wireless network connection 28 so that the tethered computing device 38 or a user of tethered computing device 38 knows whether wireless network connection 28 can be used to accomplish an action within a desired time period. The information may also include the identity of a provider or providers of telecommunications network 26 (i.e., legal entities such as corporations or government entities) as well as the geographical locations that will receive data (as used in this context, "receive" encompasses locations that are the intended final destination(s) for the data as well as locations through which the data passes through on its way to the final destination(s)). The tethered computing device 38 or a user of tethered computing device 38 can use this information to determine whether use of the wireless network connection 28 will compromise the confidentiality of communications and/or whether a communication will receive favorable or unfavorable treatment relative to other communications (e.g., telecommunications networks practicing "net neutrality" may be desirable or undesirable depending on the user). The information may also include characteristics of Quality of Service (QoS) for wireless network connection 28 including, for example, packet delay, jitter, and packet loss rates, error rates and/or guaranteed limits on such characteristics to users or prioritization of data streams.

In accordance with some embodiments of the present teachings, mobile communication device 10 may continue with the process 48 of providing, responsive to the information obtained in process 46, a set of information directly to tethered computing device 38 over the tethered connection 40 prior to use of wireless network connection 28 by tethered computing device 38 whereby tethered computing device 38 can evaluate potential use of wireless network connection 28. The information provided to tethered computing device 38 may be the same as the information obtained by mobile communication device 10 in process 46 or may comprise another set of information (e.g., filtered to remove information that is not relevant based on the structure or operation of one or both of mobile communication device 10 and tethered computing device 38 or modified to reflect information about wireless network connection 28 that varies depending upon the structure or operation of mobile communications mobile communication device 10 or the location of mobile communication device 10 as indicated by GPS receiver 19).

In accordance with one embodiment of the present teachings, process 48 may include the subprocess 50 of transmitting the information provided from mobile communication device 10 to tethered computing device 38 followed by the subprocess 52 of establishing the wireless network connection 28 between mobile communication device 10 and telecommunications network 26. In this embodiment, mobile communication device 10 transmits the information to tethered computing device 38 prior to establishing wireless network connection 28 so that tethered computing device 38 or a user of tethered computing device 38 can determine whether or not wireless network connection 28 will be sufficient for the user's needs. Tethered computing device 38 or the user can then determine whether or not to establish the wireless network connection 28 or seek another network connection.

In accordance with another embodiment of the present teachings, process 48 may include subprocess 54 of establishing the network connection 28 between mobile communication device 10 and telecommunications network 26 followed by the subprocess 56 of transmitting the information provided from mobile communication device 10 to tethered computing device 38. In this embodiment, the information may be provided to tethered computing device 38 using a handshaking process.

Tethered computing device 38 is configured to determine, responsive to the information received from mobile communications device 10 over tethered connection 40 whether to use wireless network connection 28 and one or more characteristics of any such use of wireless network connection 28. For example, one characteristic of use may comprise a limit on an amount bandwidth of wireless network connection 28 usable by tethered computing device 38.

Figure 4:
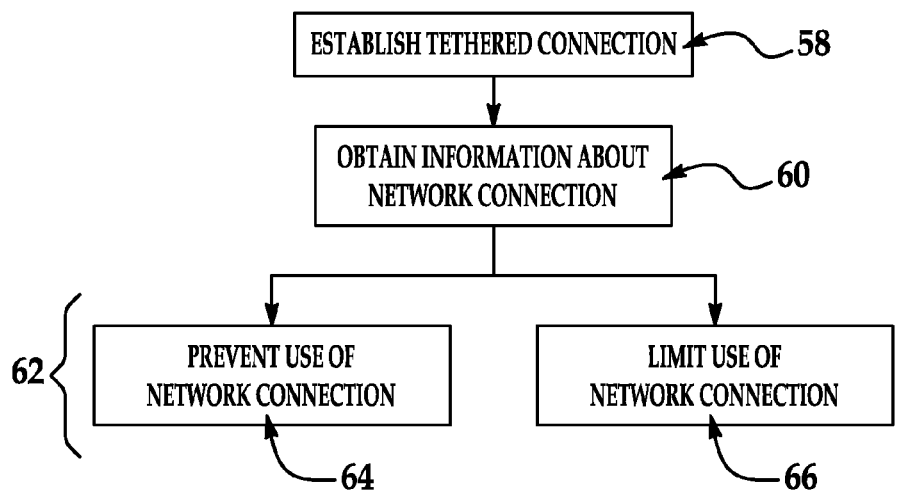
FIG. 4 is a flowchart illustrating several additional embodiments of a process in accordance with the present teachings for enabling appropriate use of a network connection between a mobile communication device and a telecommunications network by a tethered computing device.

Referring now to FIG. 4, the operation of processor 24 and mobile communication device 10 in accordance with several additional embodiments of the present teachings is illustrated. Mobile communication device 10 may again begin with the processes 58, 60 of establishing tethered connection 40 with tethered computing device 38 and obtaining a set of information regarding wireless network connection 28. Processes 58, 60 may be substantially the same as processes 44, 46 and further information regarding processes 58, 60 may therefore be found hereinabove in the description of processes 44, 46.

After the process 60 of obtaining information about the network connection 28, mobile communication device 10 may perform the process 62 of controlling use of wireless network connection 28 by tethered computing device 38 responsive to information obtained in process 60. Rather than provide information to tethered computing device 38 for a decision by tethered computing device 38 or the user of tethered computing device 38 regarding the use of wireless network connection 28, processor 24 may be programmed with appropriate programming instructions to enforce rules regarding whether and how tethered computing device 38 can use wireless network connection 28. In accordance with one embodiment of the present teachings, processor 24 may be configured to perform a subprocess 64 of preventing use of wireless network connection 28 by tethered computing device 38 if the information obtained in process 60 meets a predetermined characteristic. Alternatively, in accordance with another embodiment of the present teachings, processor 24 may be configured to perform a subprocess 66 of limiting use of wireless network connection 28 by tethered computing device 38 if the information obtained in process 60 meets a predetermined characteristic. For example, as set forth above, mobile communication device 10 may obtain information about the bandwidth of wireless network connection 28. Based on the requirements of mobile communication device 10 for this bandwidth, mobile communication device 10 may prevent access to wireless network connection 28 by tethered computing device 38 (e.g., if use by tethered computing device 38 would prevent or slow use of wireless network connection 28 by mobile communication device 10) or limit use of wireless network connection 28 to a portion of the total bandwidth of wireless network connection 28.

A mobile communication device 10 accordance with the present teachings is advantageous because the mobile communication device 10 enables appropriate use of a wireless network connection 28 between the mobile communication device 10 and a telecommunications network 26 by a tethered computing device 38. In particular, limitations of the wireless network connection 28 are either made known to the tethered computing device 38 so that the tethered device 38 can properly manage its use of the wireless network connection 28 and/or use of the wireless network connection 28 by the tethered computing device 38 is controlled by the mobile communication device 10 so that the limitations are not breached.

Although one or more particular embodiments been shown and described, it will be understood by those of skill in the art that various changes and modifications can be made without departing from the spirit and scope of the present teachings.

What is claimed is:

1. A communication system, comprising:
a mobile communication device, comprising:
a first network interface configured for connection to a telecommunications network to establish a wireless network connection with the telecommunications network;
a second network interface configured for connection to a tethered computing device to establish a tethered connection with the tethered computing device and permit the tethered computing device to use the wireless network connection; and
a processor configured to:
obtain a first set of information regarding the wireless network connection; and
provide, responsive to the first set of information, a second set of information directly to the tethered computing device over the tethered connection prior to use of the wireless network connection by the tethered computing device; and
the tethered computing device, configured to:
cause the mobile communication device to establish the wireless network connection based on the second set of information and a potential use of the wireless network connection;
determine one or more characteristics of a use of the wireless network connection based on the second set of information and the potential use of the wireless network connection; and
use the wireless network connection based on the determined one or more characteristics of the use of the wireless network connection.

2. The communication system of claim 1 wherein the second set of information comprises the first set of information.

3. The communication system of claim 1 wherein the second set of information comprises a bandwidth of the wireless network connection.

4. The communication system of claim 1 wherein the second set of information comprises a latency of the wireless network connection.

5. The communication system of claim 1 wherein the second set of information comprises an identity of a provider of the telecommunications network.

6. The communication system of claim 1 wherein the second set of information comprises a geographical coverage area of the telecommunications network.

7. The communication system of claim 1 wherein one characteristic of the one or more characteristics of the use of the wireless network connection is a limit on an amount of bandwidth of the wireless network connection usable by the tethered computing device.

8. A mobile communication device, comprising:
a first network interface configured for connection to a telecommunications network to establish a wireless network connection with the telecommunications network;
a second network interface configured for connection to a tethered computing device to establish a tethered connection with the tethered computing device and permit the tethered computing device to use the wireless network connection; and
a processor configured to:
obtain a first set of information regarding the wireless network connection;
determine one or more characteristics of the wireless network connection based on the first set of information; and
control the use of the wireless network connection by the tethered computing device responsive to the determined one or more characteristics of the wireless network connection.

9. The mobile communication device of claim 8 wherein the processor is further configured, in controlling the use, to prevent use of the wireless network connection by the tethered computing device when one of the determined one or more characteristics meets a predetermined characteristic.

10. The mobile communication device of claim 8 wherein the processor is further configured, in controlling the use, to limit use of the wireless network connection by the tethered computing device when one of the determined one or more characteristics meets a predetermined characteristic.

11. The mobile communication device of claim 8 wherein the determined one or more characteristics comprises a bandwidth of the wireless network connection.

12. The mobile communication device of claim 8 wherein the determined one or more characteristics comprises a latency of the wireless network connection.

13. The mobile communication device of claim 8 wherein the determined one or more characteristics comprises an identity of a provider of the telecommunications network.

14. The mobile communication device of claim 8 wherein the determined one or more characteristics comprises a geographical coverage area of the telecommunications network.

15. A mobile communication device, comprising:
a first network interface configured for connection to a telecommunications network to establish a wireless network connection with the telecommunications network;
a second network interface configured for connection to a tethered computing device to establish a tethered connection with the tethered computing device and permit the tethered computing device to use the wireless network connection; and
a processor configured to:
obtain a first set of information regarding the wireless network connection; and
restrict use of the wireless network connection by the tethered computing device to a portion of a total bandwidth of the wireless network connection when the first set of information meets a predetermined characteristic.

16. An article of manufacture, comprising:
a non-transitory computer storage medium having a computer program encoded thereon that when executed by a processor on a mobile communication device enables appropriate use of a wireless network connection between the mobile communication device and a telecommunications network by a tethered computing device having a tethered connection with the mobile communication device, the computer program comprising code for:
obtaining a first set of information regarding the wireless network connection;
determining one or more characteristics of the wireless network connection based on the first set of information; and
controlling the use of the wireless network connection by the tethered computing device responsive to the determined one or more characteristics of the wireless network connection.

17. The article of manufacture of claim 16 wherein the code for controlling the use comprises code for preventing use of the wireless network connection by the tethered computing device when one of the determined one or more characteristics meets a predetermined characteristic.

18. The article of manufacture of claim 16 wherein the code for controlling the use comprises code for limiting use of the wireless network connection by the tethered computing device when one of the determined one or more characteristics meets a predetermined characteristic.

19. The article of manufacture of claim 18 wherein the code for limiting use comprises code for restricting use of the wireless network connection by the tethered computing device to a portion of a total bandwidth of the wireless network connection.

20. The article of manufacture of claim 16 wherein the determined one or more characteristics comprises a bandwidth of the wireless network connection.

21. The article of manufacture of claim 16 wherein the determined one or more characteristics comprises a latency of the wireless network connection.

22. The article of manufacture of claim 16 wherein the determined one or more characteristics comprises an identity of a provider of the telecommunications network.

23. The article of manufacture of claim 16 wherein the determined one or more characteristics comprises a geographical coverage area of the telecommunications network.

* * * * *